United States Patent
Matsui

(10) Patent No.: US 8,526,052 B2
(45) Date of Patent: Sep. 3, 2013

(54) PRINT DATA PROCESSING APPARATUS, CONTROL METHOD FOR PRINT DATA PROCESSING APPARATUS, AND STORAGE MEDIUM

(75) Inventor: Kenta Matsui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/856,117

(22) Filed: Aug. 13, 2010

(65) Prior Publication Data

US 2011/0043859 A1 Feb. 24, 2011

(30) Foreign Application Priority Data

Aug. 21, 2009 (JP) ................. 2009-192237

(51) Int. Cl.
*G06K 15/00* (2006.01)
*G06F 3/12* (2006.01)

(52) U.S. Cl.
USPC ......... 358/1.16; 358/1.1; 358/1.13; 358/1.15; 358/1.17

(58) Field of Classification Search
None
See application file for complete search history.

(56) References Cited

U.S. PATENT DOCUMENTS

| | | | | |
|---|---|---|---|---|
| 5,469,533 A * | 11/1995 | Dennis | ......................... | 358/1.15 |
| 5,652,711 A * | 7/1997 | Vennekens | .................... | 358/1.17 |
| 6,115,131 A * | 9/2000 | Payne | ......................... | 358/1.14 |
| 2002/0163664 A1 * | 11/2002 | Sugano | ......................... | 358/1.15 |
| 2004/0061892 A1 * | 4/2004 | Ferlitsch | ...................... | 358/1.15 |
| 2004/0095596 A1 * | 5/2004 | Rijavec | ......................... | 358/1.15 |
| 2004/0243934 A1 * | 12/2004 | Wood et al. | .................... | 715/517 |
| 2007/0195353 A1 * | 8/2007 | Tsunoda | ......................... | 358/1.13 |
| 2008/0007754 A1 * | 1/2008 | Torii | ............................ | 358/1.12 |
| 2009/0067004 A1 * | 3/2009 | Mazur | ......................... | 358/1.17 |
| 2009/0080025 A1 * | 3/2009 | Aronshtam et al. | ......... | 358/1.17 |
| 2009/0161163 A1 * | 6/2009 | Klassen et al. | ............... | 358/1.18 |
| 2009/0251718 A1 * | 10/2009 | Khain | ......................... | 358/1.15 |
| 2010/0231952 A1 * | 9/2010 | Giannetti et al. | ............ | 358/1.15 |
| 2010/0277757 A1 * | 11/2010 | Smith | ......................... | 358/1.15 |

FOREIGN PATENT DOCUMENTS

JP 2007-152623 A 6/2007

* cited by examiner

*Primary Examiner* — King Poon
*Assistant Examiner* — Vincent Peren
(74) *Attorney, Agent, or Firm* — Canon USA Inc. IP Division

(57) ABSTRACT

A print data processing apparatus includes a first processor configured not to execute a command to convert print data to intermediate data when a resource is rasterized in accordance with a command to rasterize the resource of the print data, and to convert the print data which is not converted to the intermediate data to the intermediate data when rasterizing of the resource of the print data is finished, a management unit configured to manage the resource rasterized by the first processor so that a processor except the first processor can refer to the resource when the print data is converted to the intermediate data, and a second processor configured not to execute a command to rasterize the resource of the print data and to convert the print data to the intermediate data with reference to the resource managed by the management unit.

4 Claims, 11 Drawing Sheets

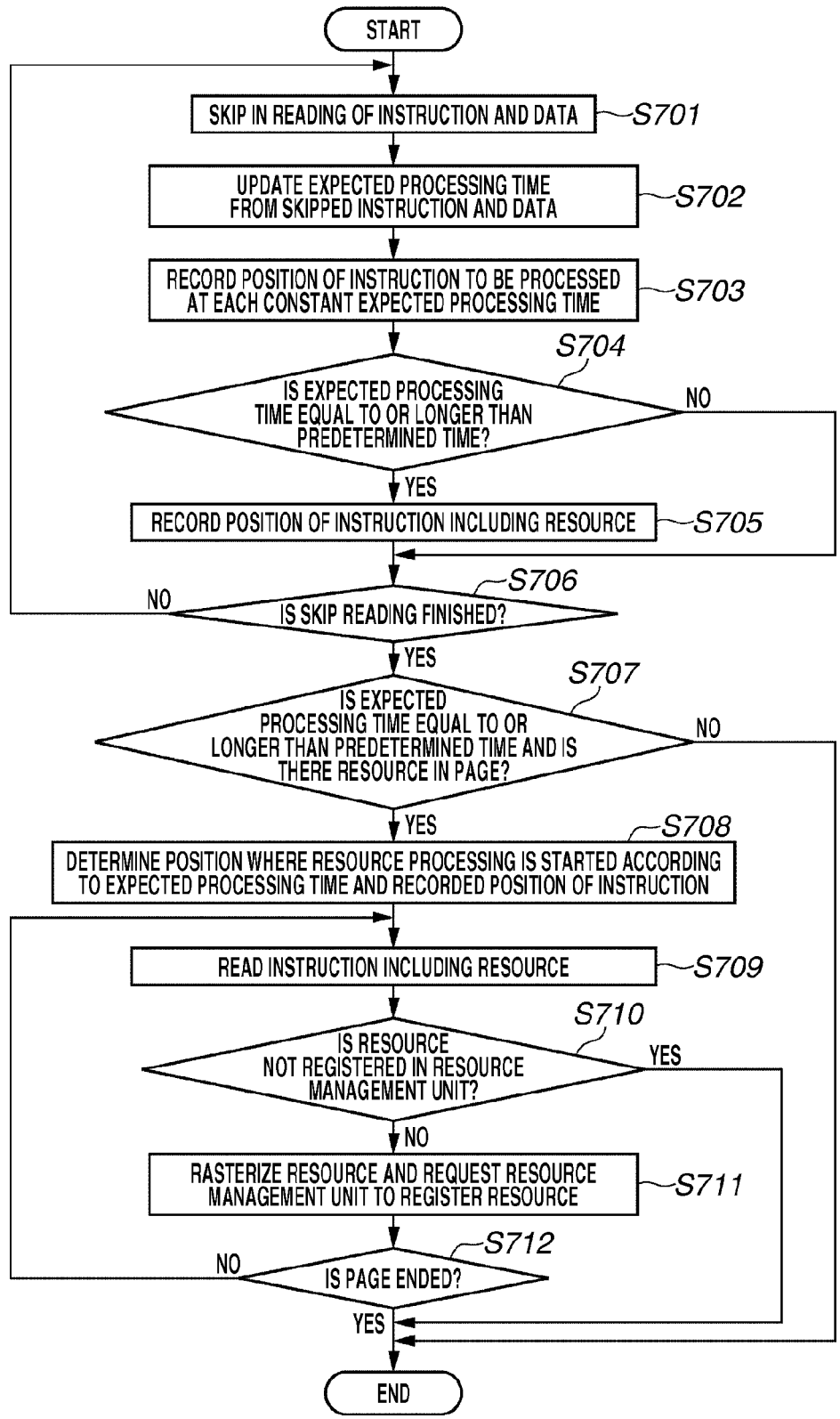

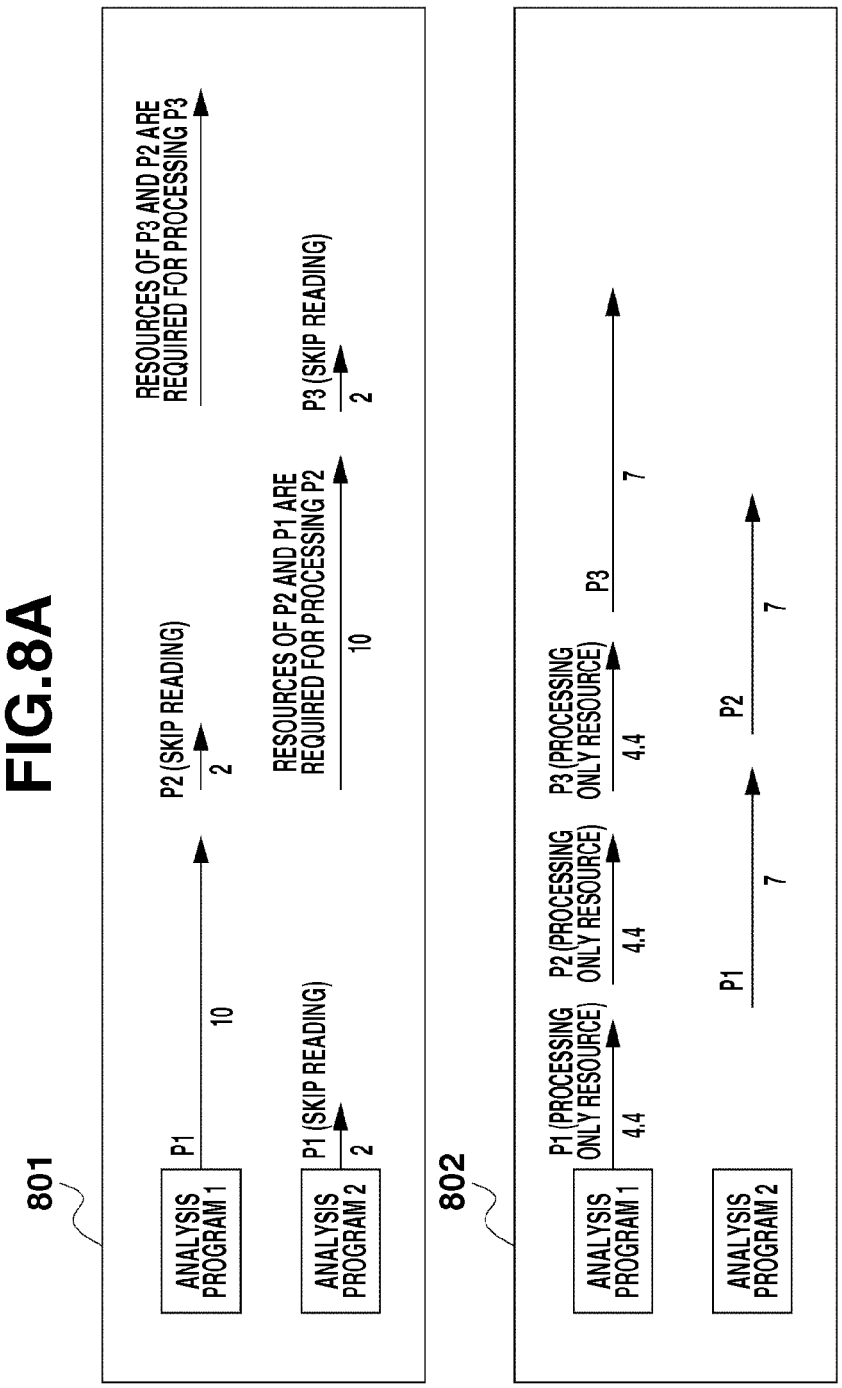

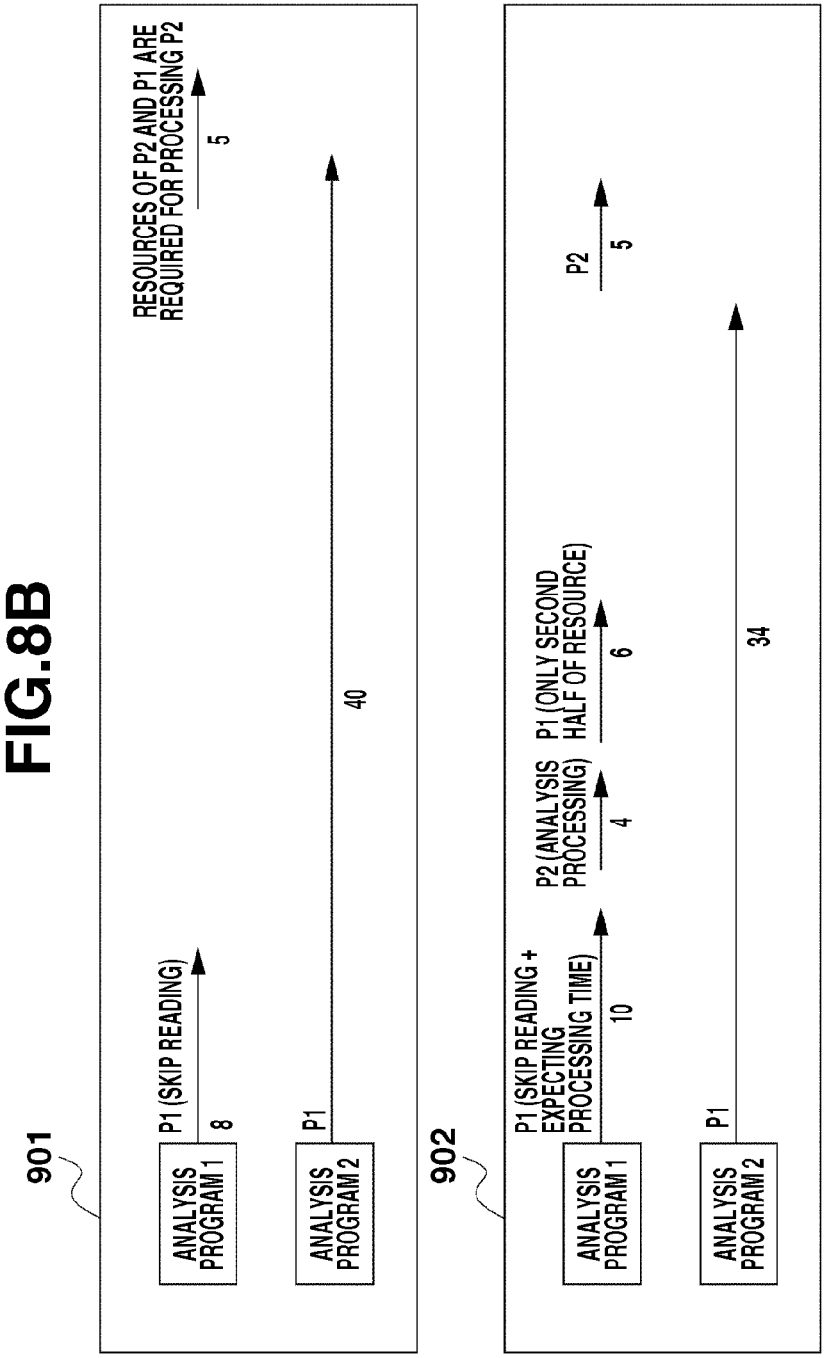

PRINT DATA PROCESSING APPARATUS, CONTROL METHOD FOR PRINT DATA PROCESSING APPARATUS, AND STORAGE MEDIUM

BACKGROUND OF THE INVENTION

1. Field of the Invention

The present invention generally relates to print data processing and, more particularly, to a print data processing apparatus, a control method for the print data processing apparatus, and storage medium.

2. Description of the Related Art

Some conventional image forming apparatuses form an image at a high speed by dividing input print data and processing it by a plurality of processors. Japanese Patent Application Laid-Open No. 2007-152623 discusses such an image forming apparatus.

Depending on a type of print data, there exist some types of print data in which a font or an image available with reference to each page is generated as a resource halfway through a page.

SUMMARY OF THE INVENTION

The present invention is directed to reduction of time for a part of processor waiting for rasterizing a resource by matching generation of the resource with timing of reference as close as possible when print data is processed by a plurality of processors.

According to an aspect of the present invention, a print data processing apparatus includes a first processor configured not to execute a command to convert print data to intermediate data when a resource is rasterized in accordance with a command to rasterize the resource of the print data, and to convert the print data which is not converted to the intermediate data to the intermediate data when rasterizing of the resource of the print data is finished, a management unit configured to manage the resource rasterized by the first processor so that a processor except the first processor can refer to the resource when the print data is converted to the intermediate data, and a second processor configured not to execute a command to rasterize the resource of the print data and to convert the print data to the intermediate data with reference to the resource managed by the management unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flow chart illustrating a print data processing procedure of a PDL analysis program according to a last exemplary embodiment.

FIGS. 8A and 8B illustrate effects of each exemplary embodiment.

DESCRIPTION OF THE EMBODIMENTS

Various exemplary embodiments, features, and aspects of the invention will be described in detail below with reference to the drawings.

Figure 1:
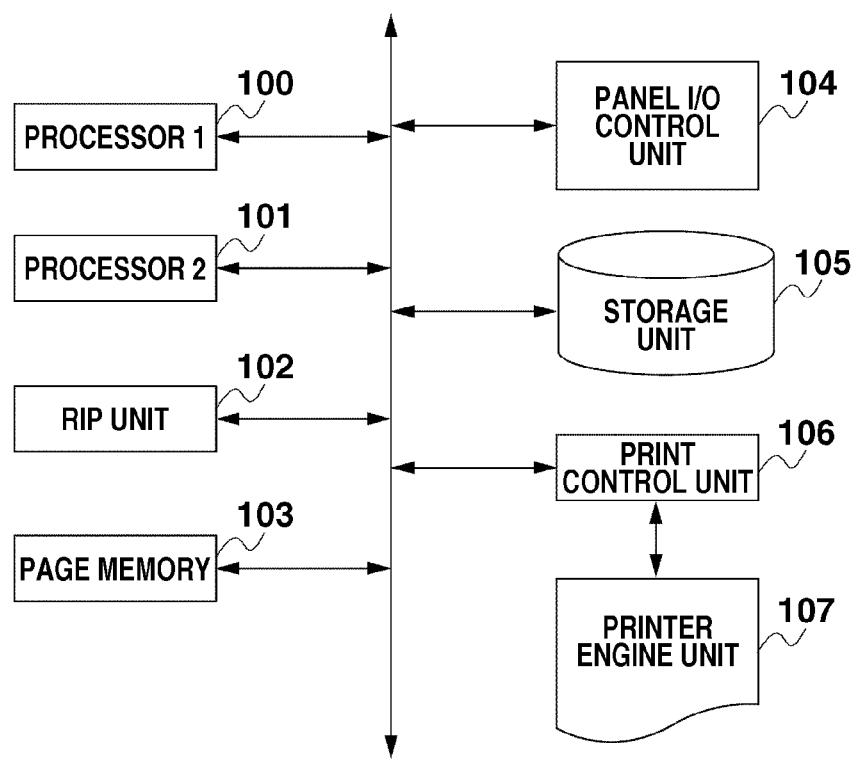
FIG. 1 is a block diagram illustrating a hardware configuration according to a first exemplary embodiment.

FIG. 1 is a block diagram illustrating a configuration of hardware of a multifunction peripheral (MFP) according to a first exemplary embodiment.

A processor (1) 100 and a processor (2) 101 analyze page description language (PDL) which is print data. A raster image processor (RIP) unit 102 which is hardware described below generates intermediate data based on the PDL (print data) so as to draw print data. The processor (1) 100 and the processor (2) 101 are realized, for example, by a central processing unit (CPU), a micro-processing unit (MPU), and/or the like.

The RIP unit 102 rasterizes the intermediate data into a raster image. The raster image data is sequentially stored in a page memory 103.

The page memory 103 temporarily stores the raster image into which the RIP unit 102 rasterizes the intermediate data. The page memory 103 further stores an analysis program 301, a page allocation program 300, a resource management program 302, and a resource table 303 which will be described below with reference to FIG. 3. The above programs are referred to as print data processing programs. The page memory 103 is realized by a random access memory (RAM).

A panel input/output (I/O) control unit 104 controls the input from and output to an operation panel.

A storage unit 105 stores the PDL. The storage unit 105 is realized by a secondary storage device such as a hard disk. The PDL is stored in the storage unit 105 to enable a user to take out the PDL whenever the user wants and to repetitively output.

A print control unit 106 converts contents in the page memory 103 into a video signal and transfers an image to a printer engine unit 107.

Figure 3:
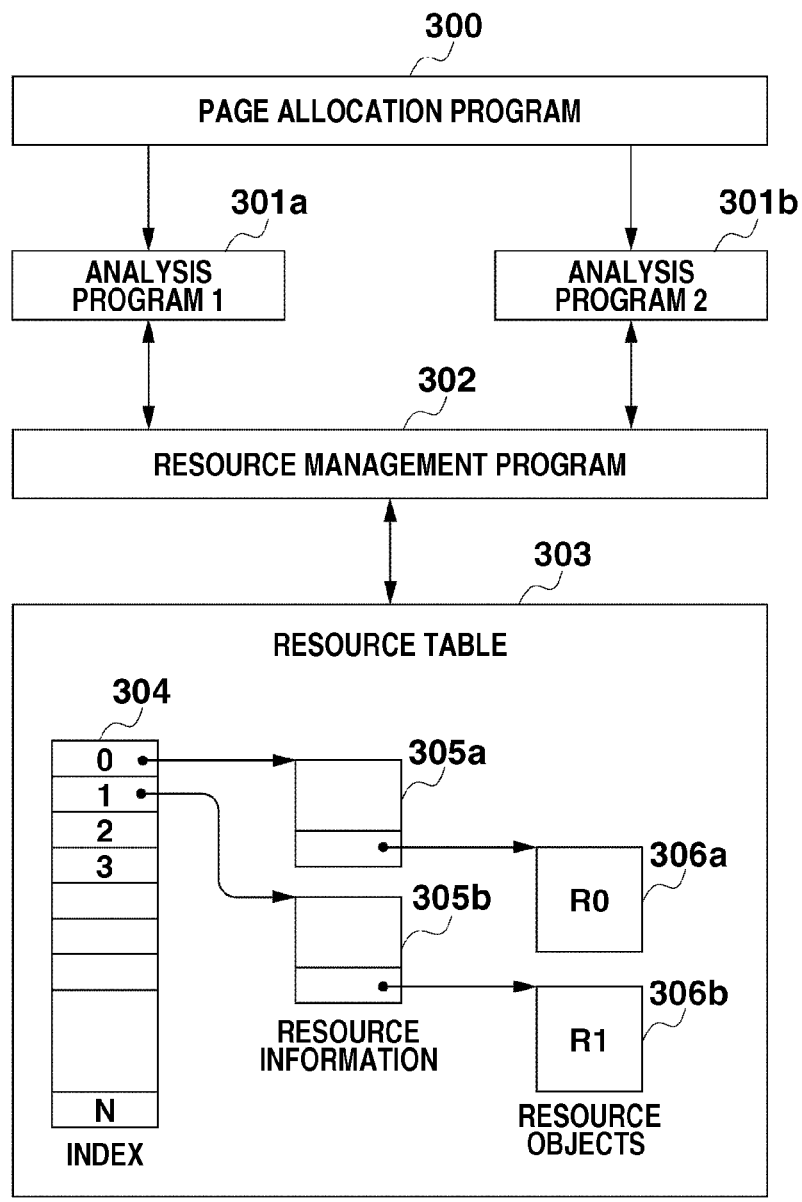
FIG. 3 is a block diagram illustrating a software module for executing processing for converting print data to intermediate data according to the first exemplary embodiment.

The printer engine unit 107 prints a received video signal on recording paper. FIG. 3 illustrates a software module for executing processing for converting print data into intermediate data in the first exemplary embodiment.

The page allocation program 300 determines how the processing of each page of the PDL is allocated to a plurality of analysis programs. The page allocation program 300 may be operated by any one of the plurality of processors. In other words, the page allocation program 300 may be operated by the processor (1) 100, the processor (2) 101, or a third processor.

The analysis program is caused by the processor to execute processing in which a print command defined by the print data is read and the print data is converted to the intermediate data in accordance with the print command. The processing is referred to as analysis. An analysis program 301a is operated by the processor (1) 100 corresponding to a first processor. An analysis program 301b is operated by the processor (2) 101 corresponding to a second processor.

The resource management program 302 manages all resources included in the PDL in an integrated fashion by a unique resource identification (ID) so that each CPU can share the resources. A unique ID is allocated to the resource to prevent the resource ID from being duplicated among the resources. The resource management program 302 may be operated by any one of the plurality of processors. In other words, the page allocation program 300 may be operated by the processor (1) 100, the processor (2) 101, or a third processor. The resource refers to data which is once rasterized and repetitively used when the PDL formed of a plurality of pages is converted to the intermediate data.

The resource table 303 includes an index 304, resource information 305a and 305b which is additional information about resources, and resource objects 306a and 306b which are the rasterized resources used by each page of the PDL.

The index 304 is a structure using the resource ID as an index. The pieces of resource information 305a and 305b are structures for storing additional information about resources such as a width and height of a font, for example. The resource objects 306a and 306b are bit maps indicating a shape of the font, for example, and main body data of the resource.

As illustrated in the resource table 303, the resource ID is associated with the resource object by a link. In FIG. 3, the index 304, the resource information 305a, and the resource object 306a are linked. It can be seen that the resource of the resource ID=0 is the object 306a. Similarly, the resource of the resource ID=1 is the object 306b.

Figure 9:
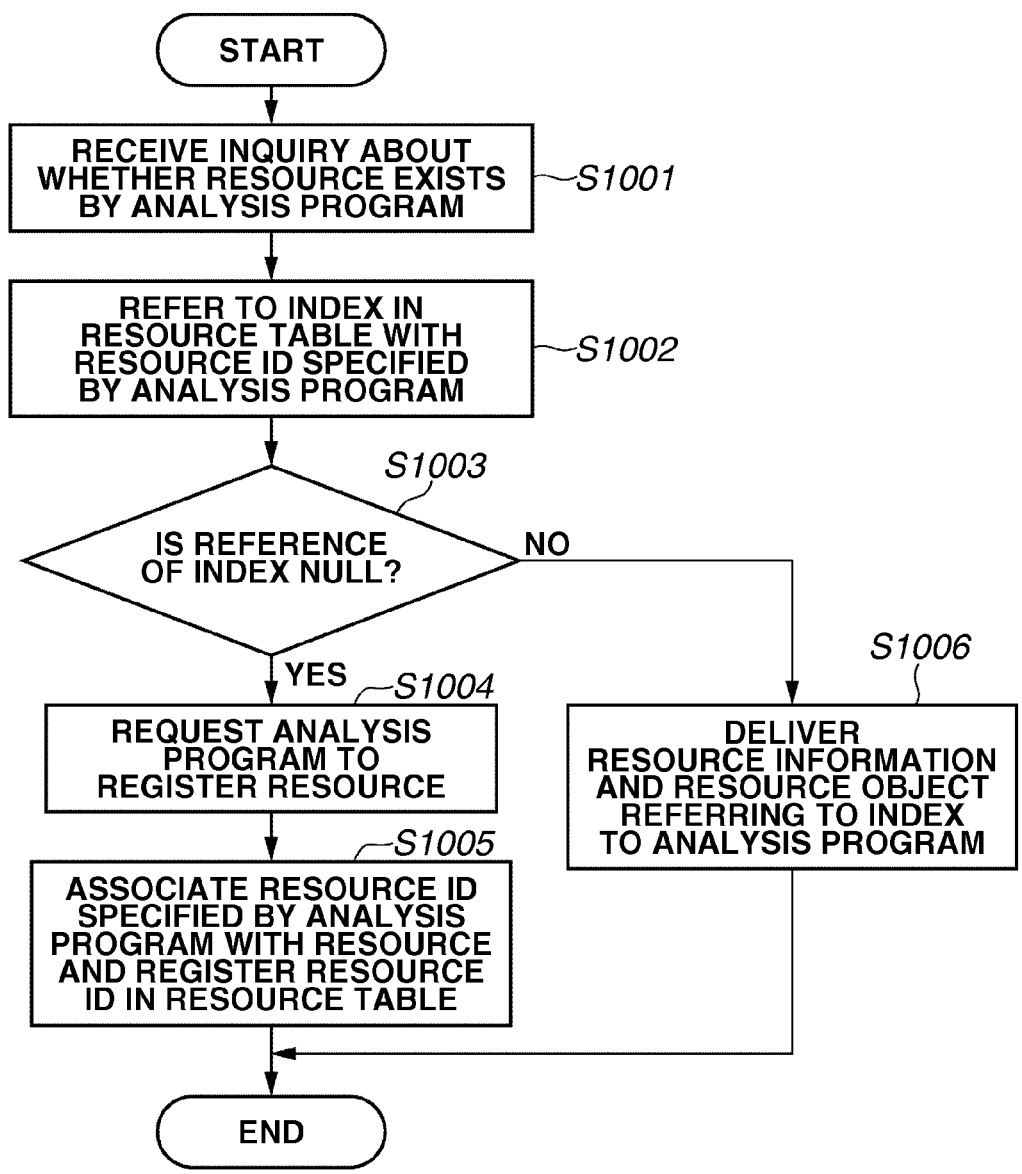
FIG. 9 is a flow chart illustrating a management processing procedure of a resource management program.

The management processing of the resource management program 302 is described below with reference to the flowchart illustrated in FIG. 9.

In step S1001, the resource management program 302 receives an inquiry for whether a resource exists or not from the analysis programs 301a and 301b.

In step S1002, the resource management program 302 refers to the index 304 in the resource table 303 with the resource ID specified by the analysis program.

In step S1003, the resource management program 302 confirms whether the reference of the index is null. If the reference of the index is null (YES in step S1003), the processing proceeds to step S1004. If the reference of the index is not null (NO in step S1003), the processing proceeds to step S1006. If the reference of the index is null, it means that there is no rasterized resource.

In step S1004, the resource management program 302 notifies the analysis program 301a, for example, which inquires whether a resource exists or not, that the resource is not yet registered.

In step S1005, the resource management program 302 associates the resource ID specified by the analysis program inquiring whether a resource exists with a resource by the index 304, the resource information 305, and the resource object 306. Then the resource management program 302 registers the resource ID associated with the resource in the resource table.

In step S1006, the resource management program 302 refers to the index 304 from the resource ID specified by the analysis program and delivers the resource information and the resource object corresponding to the resource ID to the analysis program.

The resource management program 302 thus operates and manages the resource to allow the analysis programs 301a and 301b to share the resource.

Figure 4:
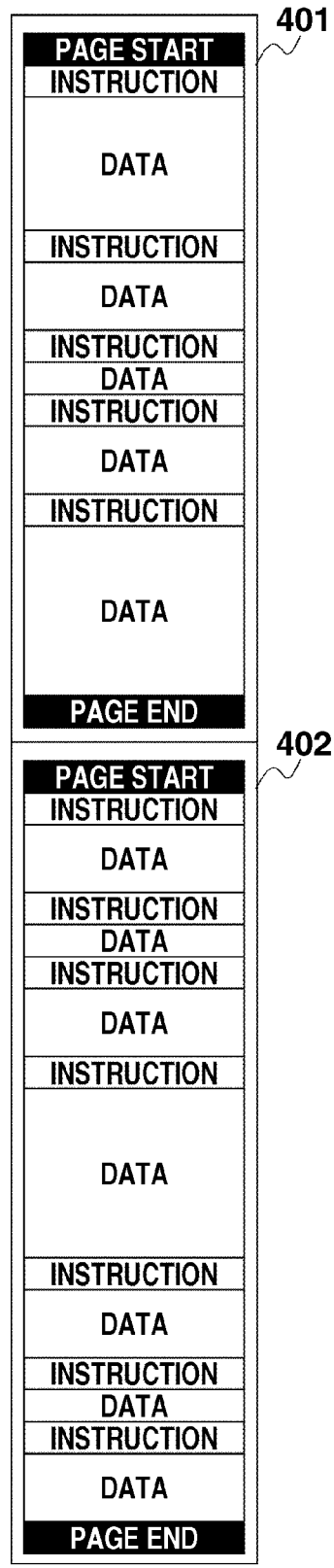
FIG. 4 illustrates a data configuration of a general PDL.

The configuration of the PDL is described below with reference to FIG. 4. The PDL includes instructions (print commands) including a command indicating a start and an end of a page, a command indicating an instruction to draw an image, a command indicating rasterization and use of a resource and data attached to each instruction.

The PDL analysis program 301 reads an instruction, processes data according to the instruction, and generates intermediate data. Such a series of processing is referred to as analysis in the first exemplary embodiment.

In the first exemplary embodiment, the PDL analyzed by the PDL analysis program 301 is not permitted to randomly read (random access) instructions as specifications for accessing the PDL. The PDL analyzed by the PDL analysis program 301 is permitted only to sequentially read (sequential access) instructions. The PDL which is permitted only to perform sequential access needs to start accessing head data on a page 1 (401) even if it is desired to skip the page 1 and access a page 2 (402).

The PDL permitted only to perform sequential access has a technique in which a read instruction is not actually executed and data the contents of which need to be confirmed is skipped in reading in order to quickly access a target page. In the first exemplary embodiment, such a technique of quickly accessing a target page or an instruction is referred to as "skipping."

Figure 2:
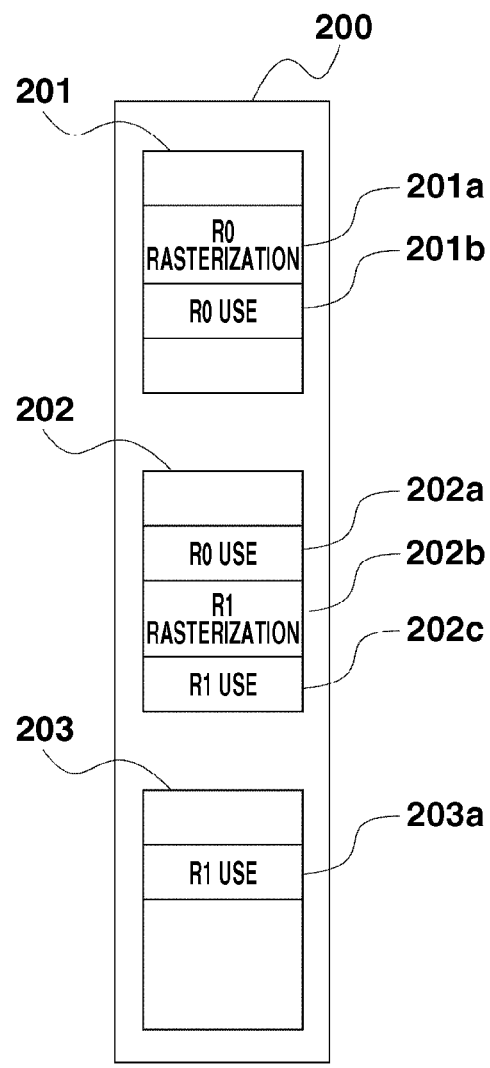
FIG. 2 illustrates a configuration of page description language (PDL) analyzed by the first exemplary embodiment.

FIG. 2 illustrates a configuration of the PDL analyzed by the analysis program 101 according to the first exemplary embodiment.

A PDL 200 is formed of pages 201, 202, and 203. The page 201 stores a compressed resource R0 (not illustrated) usable in each page. The page 201 also includes a rasterization command (201a) by which the resource can be used on each page. The rasterized RO in the PDL illustrated in FIG. 2 is used on pages 201 and 202 (201b and 202a). The term rasterization refers to a conversion of compressed image data such as a joint photographic experts group (JPEG) to image data of the Bitmap format or a conversion of a character code to a character pattern.

Similarly, the page 202 stores a compressed resource R1 (not illustrated) and includes the rasterization command (202b) of the compressed resource R1. The rasterized R1 is used on pages 202 and 203 (202c and 203a).

When the PDL analysis program 301 uses the resources R0 or R1, each resource needs to be already rasterized. When the PDL analysis program 301 is operated by the plurality of processors which shares the resource, however, the rasterization processing of the resource cannot be in time.

For example, it is assumed that the first processor among the plurality of processors analyzes the page 201 and the second processor thereamong analyzes the page 202. In this case, if the second processor uses the resource R0, the first processor is not yet finished the rasterization processing of the resource R0, which means that the rasterization processing of the resource is not in time.

The PDL analysis program 301 can understand that data rasterized when the PDL analysis program 301 reads the instruction is the resource shared by a plurality of pages. This is because the instruction includes information indicating that data attached to the read instruction is the resource.

Figure 5:
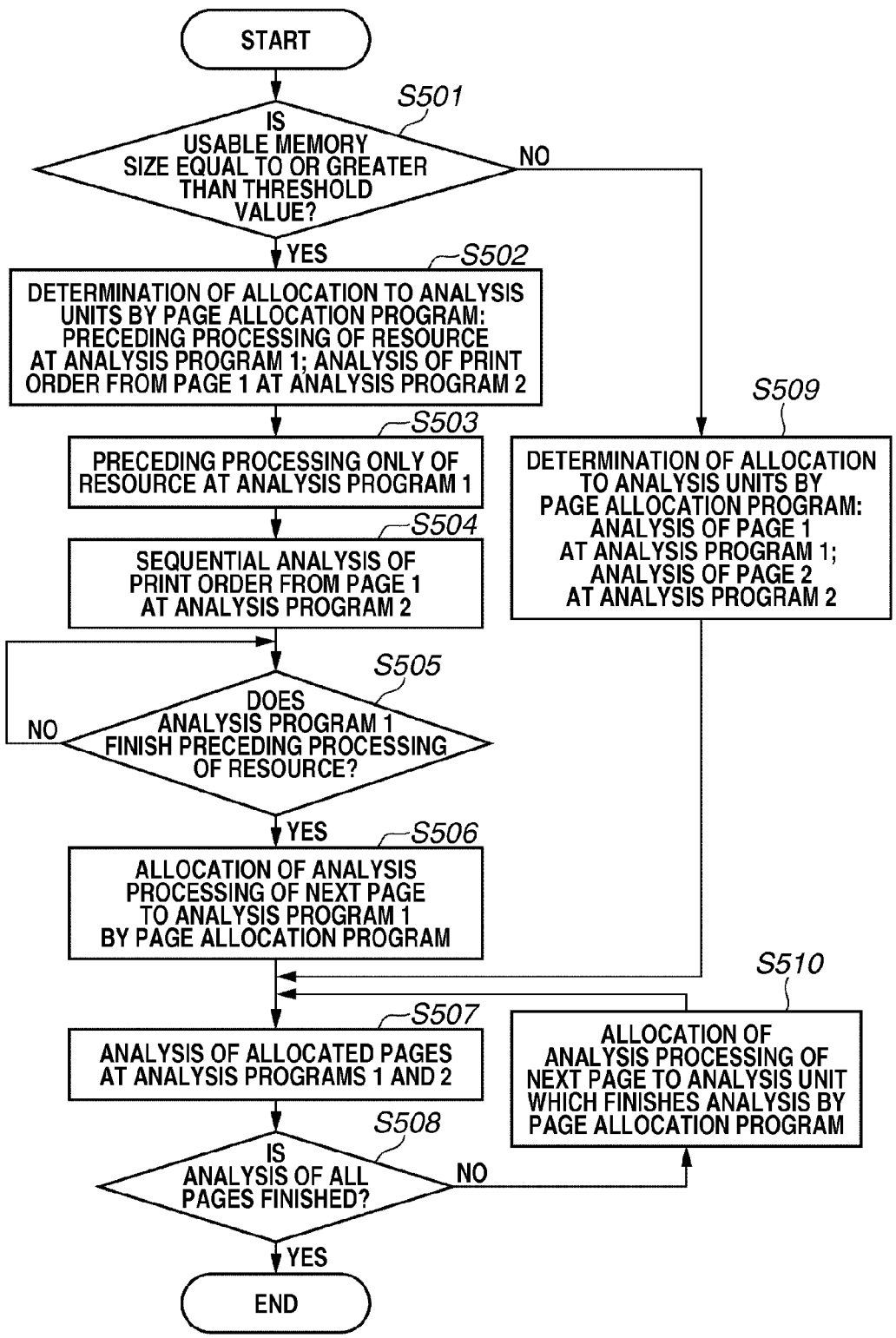
FIG. 5 is a flow chart illustrating a print data processing procedure of a PDL analysis program according to the first exemplary embodiment.

A print data processing procedure of the analysis program in the first exemplary embodiment is described below with reference to the flow chart illustrated in FIG. 5.

In step S501, the PDL analysis program 301 confirms a size of the memory managed and used by the analysis program itself. If the size of the memory is equal to or greater than a predetermined threshold value (300 MB or more, for example) (YES in step S501), the PDL analysis program 301 determines that the memory is large enough to rasterize and store the resource included in the PDL and the processing proceeds to step S502. If the size of the memory is smaller than the predetermined threshold value (300 MB or less, for example) (NO in step S501), the PDL analysis program 301 determines that a memory capacity for storing the resource is short and the processing proceeds to step S509. Thus, a method for processing the resource of the analysis program is changed according to the size of the memory to allow minimizing a time period during which one analysis program waits for the rasterization of the resource of another analysis program. This enables more efficient analysis of the PDL.

In step S502, the page allocation program 300 allocates a role of processing for which each analysis program is responsible. In the first exemplary embodiment, the page allocation program 300 causes the analysis program 301$a$ to perform the prior processing of rasterization of the resource and the analysis program 301$b$ to analyze a print command on a page 1 and subsequent pages to convert the print data to the intermediate data.

In step S503, the analysis program 301$a$ performs the processing of rasterization of the resource prior to the analysis program 301$b$ without executing the print command of the print data (a command of drawing an image). At this point, the above described skipping technique is used, so that the processing of rasterization of the resource can be performed faster than the processing in which all print commands are analyzed and executed. The analysis program 301$a$ registers the rasterized resource in the resource table so that the analysis program 301$b$ can refer to the resource.

In step S504, the analysis program 301$b$ sequentially starts the analysis processing of pages in which the analysis program 301$a$ finishes the prior processing of the resource. The analysis program 301$b$ does not execute the rasterization command of resource of the PDL and performs the conversion of the PDL to the intermediate data with reference to the resource rasterized by the analysis program 301$a$. If the page on which the analysis program 301$b$ performs the analysis processing catches up the page on which the analysis program 301$a$ performs the prior processing of the resource, the following processing is performed. The processing is performed such that the analysis program 301$a$ finishes the prior processing of the resource on the corresponding page and then the analysis program 301$b$ starts the analysis processing on the corresponding page.

In step S505, the page allocation program 300 confirms whether the resource processing of the analysis program 301$a$ is finished. If the resource processing is finished (YES in step S505), the processing proceeds to step S506. If the resource processing is not finished (NO in step S505), the processing in step S505 is repeated. In other words, the analysis program 301$a$ executes the rasterization processing of the resource.

In step S506, the page allocation program 300 causes the analysis program 301$a$ to perform the analysis processing on a next page (the page following the page analyzed by the analysis program 301$b$). The analysis program 301$a$ finishing the rasterization processing of the resource may execute the print command which is not yet analyzed by the analysis program 301$b$, in the pages which are analyzed by the analysis program 301$b$.

In step S507, the analysis programs 301$a$ and 301$b$ perform the analysis processing of pages for which each analysis program is responsible.

In step S508, the page allocation program 300 determines whether the analysis programs 301$a$ and 301$b$ finish the analysis processing on all pages. If the analysis programs 301$a$ and 301$b$ do not finish the processing (NO in step S508), the processing proceeds to step S510.

In step S510, the page allocation program 300 confirms the progress of analysis of the analysis programs 301$a$ and 301$b$ and causes the analysis program which finishes the analysis to perform analysis on a page required for the next to be analyzed.

In step S509, the page allocation program 300 determines allocation to the analysis programs. The page allocation program 300 allocates the analysis processing on the page 1 to the analysis program 301$a$ and the analysis processing on the page 2 to the analysis program 301$b$.

FIG. 8A illustrates a conventional performance 801 and a performance 802 of the first exemplary embodiment to represent an effect of the first exemplary embodiment.

In the PDL for three pages illustrated in FIG. 2, it is assumed that time required for executing all instructions and all pieces of data included in the PDL for one page is taken as 10 seconds. The processing of the resource such as a command for the rasterization and use of the resource accounts for 30% (3 seconds) of the total time and others account for 70% (7 seconds). Further, it is supposed that the time required for the processing in which instructions and data are skipped is reduced by 20% of the time required for the processing in which instructions and data are not skipped.

At this time, the time required for processing only the resource on each page is equal to the sum total (4.4 seconds) of both the time required for processing the resource (3 seconds) and the time required for skipping other processes excluding the resource (7 seconds) (i.e., 7 seconds*20%=about 1.4 seconds). As a result, time T1 (30 seconds) of the conventional performance 801 is greater than time T2 (20.2 seconds) of the performance 801 of the first exemplary embodiment, so that it is confirmed that the first exemplary embodiment can efficiently perform the PDL analysis.

Figure 6:
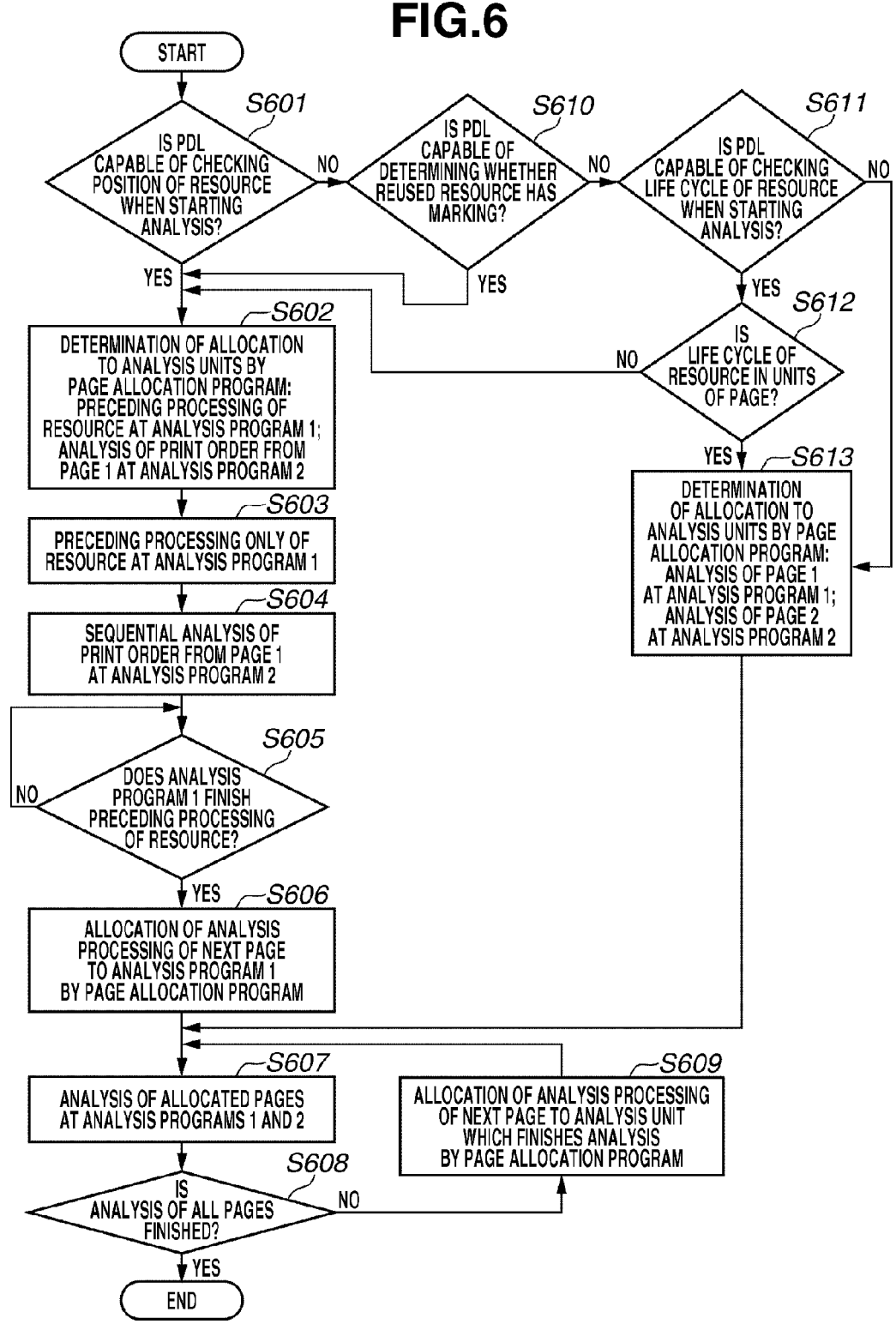
FIG. 6 is a flow chart illustrating a print data processing procedure of a PDL analysis program according to another exemplary embodiment.

A print data processing procedure of the PDL analysis program 301 in another exemplary embodiment is described below with reference to the flow chart illustrated in FIG. 6. The configuration of hardware and that of software for converting print data to intermediate data based on the print data are similar to those of the first exemplary embodiment, so that the description thereof is omitted.

In step S601, the PDL analysis program 301 checks a position of the resource in the PDL to be analyzed. The position of the resource refers to data attached to an instruction including the rasterization command of the resource. As a result, if it is checked that the PDL is capable of ascertaining the position of the resource at the time of starting analysis (YES in step S601), the processing proceeds to step S602. If not (NO in step S601), the processing proceeds to step S610. A specific example of a PDL capable of ascertaining the position of the resource at the time of starting analysis includes an Extensible Markup Language (XML) Paper Specification (XPS) which is a general electronic document format. The resource included in the XPS is stored in a resource dedicated folder "resources."

The method for processing the resource of the analysis program is changed according to the characteristics of the PDL to be analyzed to allow minimizing the time period during which one analysis program waits for the rasterization of the resource of another analysis program (the performances of another exemplary embodiment are similar to those of the first exemplary embodiment, so that the description thereof is omitted). This enables more efficient analysis of the PDL.

In step S602, the page allocation program 300 allocates a role of processing for which each analysis program is responsible. The page allocation program 300 causes the analysis program 301a to perform the prior processing of rasterization of the resource and the analysis program 301b to analyze a print command on a page 1 and subsequent pages to convert the print data to the intermediate data.

In step S603, the analysis program 301a performs the processing of rasterization of the resource prior to the analysis program 301b. At this point, the above described skipping technique is used, so that the processing of rasterization of the resource can be performed faster than the processing in which all print commands are analyzed and executed.

In step S604, when the analysis program 301a finishes the prior processing of the resource on the page 1, the analysis program 301b starts the analysis processing on the page 1. The analysis program 301b sequentially performs the analysis processing of the pages in which the analysis program 301a finishes the prior processing of the resource. If the page on which the analysis program 301b performs the analysis processing catches up the page on which the analysis program 301a performs the prior processing of the resource, the following processing is performed. The processing is performed such that the analysis program 301a finishes the prior processing of the resource on the corresponding page and then the analysis program 301b starts the analysis processing on the corresponding page.

In step S605, the page allocation program 300 confirms whether the resource processing of the analysis program 301a is finished. If the resource processing is finished (YES in step S605), the processing proceeds to step S606. If not (NO in step S605), the processing in step S605 is repeated. In other words, the analysis program 301a executes the rasterization processing of the resource.

In step S606, the page allocation program 300 causes the analysis program 301a to perform the analysis processing on a next page (the page following the page analyzed by the analysis program 301b). The analysis program 301a finishing the rasterization processing of the resource may execute the print command which is not yet analyzed by the analysis program 301b, in the pages which are analyzed by the analysis program 301b.

In step S607, the analysis programs 301a and 301b perform the analysis processing of pages for which each analysis program is responsible.

In step S608, the page allocation program 300 determines whether the analysis programs 301a and 301b finish the analysis processing on all pages. If the analysis programs 301a and 301b do not finish processing (NO in step S608), the processing proceeds to step S609.

In step S609, the page allocation program 300 confirms the progress of analysis of the analysis programs 301a and 301b and causes the analysis program which finishes the analysis to perform analysis on a page required for the next to be analyzed.

In step S610, the PDL analysis program 301 confirms the PDL to be analyzed. If the PDL is capable of determining whether the resources are reused while analyzing the PDL (YES in step S610), the processing proceeds to step S602. If not (NO in step S610), the processing proceeds to step S611.

Such a PDL which can determine whether the resources are reused includes a personalized print markup language (PPML) in which a tag indicates a linguistic reuse is introduced.

In step S611, the PDL analysis program 301 confirms the PDL to be analyzed. If the PDL is capable of ascertaining a life cycle of the resource at the time of starting analysis (YES in step S611), the processing proceeds to step S612. If not (NO in step S611), the processing proceeds to step S613.

The life cycle of the resource refers to a range in which rasterized resource is used. For a resource used only in a rasterized page, the life cycle thereof is in units of pages. For a resource used not only in a rasterized page, but also in other ones, the life cycle thereof is in units of jobs.

Information about such a life cycle can be arbitrary included in the PDL which is generated via a driver, such as a PC (personal computer) or the like.

In step S612, the PDL analysis program 301 confirms the life cycle of the resource included in the PDL. If the life cycle is a page (YES in step S612), the processing proceeds to step S613. If not (NO in step S612), the processing proceeds to step S602. For the PDL in which the life cycle of the resource is a page, the analysis program does not need to take care of the processing of resource of other analysis programs to allow each page to be sequentially analyzed.

In step S613, the page allocation program 300 determines allocation to the analysis programs. The page allocation program 300 allocates the analysis processing on the page 1 to the analysis program 301a and the analysis processing on the page 2 to the analysis program 301b.

In a last exemplary embodiment, a method for processing a resource performed by the PDL analysis program 301, in a case where the amount of data on a page of a PDL to be analyzed is extremely large, is described below with reference to a flow chart illustrated in FIG. 7. The configuration of hardware and that of software for converting print data to intermediate data based on the print data are similar to those of the first exemplary embodiment and another exemplary embodiment, so that the description thereof is omitted.

The PDL analysis program 301a analyzes a page m and the PDL analysis program 301b analyzes a page n. The page n follows the page m. FIG. 7 illustrates processing performed by the PDL analysis programs 301a and 301b in the case where the amount of data on the page n of print data is larger than a specified amount of data.

In step S701, when the PDL analysis program 301a finish analyzing data on the page m accesses a next page following the page m that the PDL analysis program 301a is responsible for. The PDL analysis program 301a skips instructions and data on the page n which is being analyzed by the PDL analysis program 301b.

In step S702, the PDL analysis program 301a expects processing time required for converting the instructions and data to intermediate data from the instructions and data on the page N which is skipped in step S701. The PDL analysis program 301a adds up the expected time to expect an expected processing time on the page n. The expected processing time is the time required for converting the print data on the skipped page n to the intermediate data. In step S703, the PDL analysis program 301a records the position of the skipped instructions at intervals of a predetermined constant expected processing time.

Figure 10:
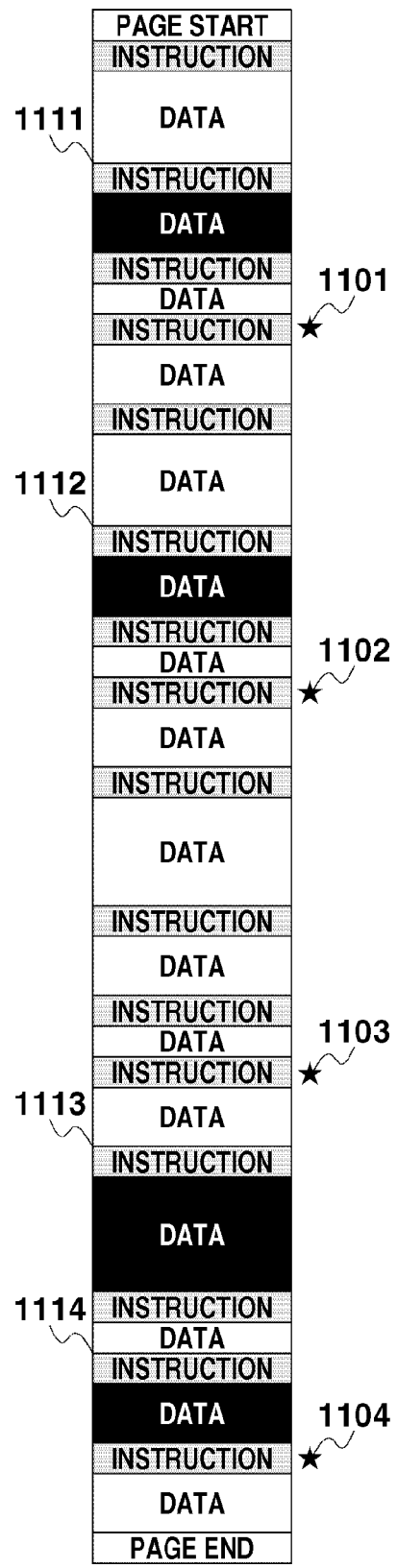
FIG. 10 illustrates positions of skipped instructions.

FIG. 10 illustrates recorded positions of the skipped instructions at intervals of ten seconds of the expected processing time. Instructions 1101, 1102, 1103, and 1104 with an asterisk denote the skipped instructions at 10, 20, 30, and 40 seconds of the expected processing time respectively. Instructions 1111, 1112, 1113, and 1114 denote the rasterization commands of the resource and the following black portion is a data portion for the instruction.

In step S704, the PDL analysis program 301a confirms the expected processing time and the skipped instructions. If the expected processing time is equal to or longer than specified time and the skipped page is the instructions including the resource (YES in step S704), the processing proceeds to step S705. If not (NO in step S704), the processing proceeds to step S706. In step S705, the PDL analysis program 301b confirms instructions including the resource among the print commands read while skipping and records the position of the instructions including the resource. In step S706, the PDL analysis program 301b confirms whether skipping the page m is finished. If the skipping is finished (YES in step S706), the processing proceeds to step S707. If not (NO in step S706), the processing is repeated between steps S701 and S706.

In step S707, the PDL analysis program 301a confirms whether the expected processing time on the page n is equal to or longer than the specified time and there is the resource shared by the plurality of pages on the page n. If the expected processing time is equal to or longer than the specified time (the expected processing time is 30 seconds or longer, for example) and there is the resource (YES in step S707), the processing proceeds to step S708 where instead of the PDL analysis program 301b, the PDL analysis program 301a performs the processing of the resource on the page n. If not (NO step S707), the PDL analysis program 301a finishes skipping the page n and moves to the analysis processing on a page 2.

In step S708, the PDL analysis program 301a determines the next position from the expected processing time calculated in step S702 and the position of instructions recorded insteps S703 and S705. The term next position refers to the position of the resource on the page n where the PDL analysis program 301b does not yet perform rasterization.

In the example illustrated in FIG. 10, the rasterization processing of the resource is started in the position of the instruction 1113 which exceeds the specified time (30 seconds).

In step S709, the analysis program 301a reads the instruction (the instruction 1113 in the last exemplary embodiment) in the determined starting position.

In step S710, the analysis program 301a confirms that the resource included in the instruction is not registered in the resource management program 302. If the resource is not registered (NO in step S710), the processing proceeds to step S711. If the resource is registered (YES in step S710), it means that the resource is already registered by the analysis program 301b, so that the processing of the resource on the page n by the analysis program 301a is ended.

In step S711, the analysis program 301a rasterizes the resource included in the instruction and registers the rasterized resource in the resource management program.

FIG. 8B illustrates a conventional performance 901 and a performance 902 of the last exemplary embodiment and represents the effect of the last exemplary embodiment. A page P1 represents the page n and a page P2 represents a page next to be analyzed by the analysis program 301a that analyzed the page m.

The PDL formed of two pages is supposed. Time required for executing all instructions and all pieces of data included in the PDL, such as a command indicating the start and end of a page, a command indicating an instruction to draw an image, and a command indicating the rasterization and use of the resource is taken as 40 seconds on the page n and 5 seconds on the page m.

Suppose that the processing of the command indicating the rasterization and use of the resource on the page n accounts for 30% (12 seconds) of the whole and others account for 70% (28 seconds). Further, it is supposed that the time required for the processing in which instructions and data are skipped is reduced by 20% of the time required for the processing in which instructions and data are not skipped.

At this point, the processing of the analysis program 1 includes the skipping of the page n (10*80%=8 seconds) and the expectation of the processing time (supposed to be 2 seconds). In the next place, the processing of the analysis program 1 includes time for analysis performed halfway through the page 1 (supposed to be 4 seconds) and time for processing on the latter half of the page 2 (6 seconds). Further, the time for the final processing on the page 2 (5 seconds) is included.

As a result, time T3 for the conventional performance 901 (45 seconds) is greater than time T4 for the performance 902 of the last exemplary embodiment (39 seconds), so that it is confirmed that the last exemplary embodiment can efficiently perform the PDL analysis.

As described in the last exemplary embodiment, the method for processing the resource of the analysis program is changed according to the page to be analyzed to allow minimizing a time period during which one analysis program waits for the rasterization of the resource of another analysis program. This enables more efficient analysis of the PDL.

The analysis program 301a in the last exemplary embodiment already finishes analyzing data on the page m. However, the analysis program 301a is responsible for analyzing data on the page 2, so that the analysis program 301a skips the page 1 which is being analyzed by the analysis program 301b in the following manner. The analysis program 301a rasterizes the resource on the page n without analyzing print data on any page.

Although the two analysis programs are executed in the above described exemplary embodiments, three or more analysis programs may be executed. In this case, a third processor is required in addition to the first and the second processors.

Although the two analysis programs are executed using the two CPUs in the above described exemplary embodiments, the two analysis programs may be executed using one multi-core processor CPU. In this case, each of the analysis programs is executed using one core processor. The core processor refers to an aggregate which is operated by a combination of a command issuing unit and a calculator existing in the processor. The multi-core processor refers to the processor including a plurality of core processors.

Aspects of the present invention can also be realized by a computer of a system or apparatus (or devices such as a CPU, a MPU, and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-192237 filed Aug. 21, 2009, which is hereby incorporated by reference herein in its entirety.

What is claimed is:

1. A print data processing apparatus comprising:
a first processor configured not to execute a command to convert print data to intermediate data when a resource is rasterized in accordance with a command to rasterize the resource of the print data, and to convert the print data which is not converted to the intermediate data to the intermediate data when rasterizing of the resource of the print data is finished;

a management unit configured to manage the resource rasterized by the first processor so that a processor except the first processor can refer to the resource when the print data is converted to the intermediate data; and a second processor configured not to execute a command to rasterize the resource of the print data and to convert the print data to the intermediate data with reference to the resource managed by the management unit, wherein when any one of the first processor or the second processor confirms a size of a memory used when the print data is converted to the intermediate data and the size of the confirmed memory is equal to or greater than a threshold value, the first processor rasterizes the resource in accordance with the command to rasterize the resource of the print data without executing a command to draw an image of print data and the second processor converts the print data to the immediate data with reference to the resource managed by the management unit without executing the command to rasterize the resource of the print data, and when the size of the confirmed memory is smaller than the threshold value, the first processor rasterizes the resource of the print data on a page allocated to the first processor and converts the print data to the intermediate data using the rasterized resource and the second processor rasterizes the resource of the print data on a page allocated to the second processor and converts the print data to the intermediate data using the rasterized resource.

2. An image forming apparatus comprising:

the print data processing apparatus according to claim 1; and a printing unit configured to print an image drawn based on intermediate data converted from print data.

3. A method for controlling a print data processing apparatus, the method comprising:

causing a first processor not to execute a command to convert print data to intermediate data when a resource is rasterized in accordance with a command to rasterize the resource of the print data and to convert the print data which is not converted to the intermediate data to the intermediate data when rasterizing of the resource of the print data is finished;

causing a management unit to manage the resource rasterized by the first processor so that a processor except the first processor can refer to the resource when the print data is converted to the intermediate data;

causing a second processor not to execute the command to rasterize the resource of the print data and to convert the print data to the intermediate data with reference to the resource managed by the management unit;

causing any one of the first processor or the second processor to confirm a size of a memory used when the print data is converted to intermediate data;

when the size of the confirmed memory is equal to or greater than a threshold value, causing the first processor to rasterize the resource in accordance with the command to rasterize the resource of the print data without executing a command to draw an image of print data, and causing the second processor to convert the print data to the immediate data with reference to the resource managed by the management unit without executing the command to rasterize a resource of print data; and when the size of the confirmed memory is smaller than the threshold value, causing the first processor to rasterize the resource of the print data on a page allocated to the first processor and to convert the print data to the intermediate data using the rasterized resource and causing the second processor to rasterize the resource of the print data on a page allocated to the second processor and to convert the print data to the intermediate data using the rasterized resource.

4. A non-transitory storage medium storing a program for causing a computer to execute the method for controlling a print data processing apparatus according to claim 3.

* * * * *